United States Patent Office 3,795,701
Patented Mar. 5, 1974

3,795,701
COPOLYMERS OF EPOXIDES AND LACTONES
Victor Frederick Jenkins, St. Albans, Michael John Beeken, Luton, and Stephen Pennington, Formby, England, assignors to Laporte Industries Limited, London, England
No Drawing. Filed Feb. 7, 1972, Ser. No. 224,332
Int. Cl. C08g 17/007, 17/017
U.S. Cl. 260—484 A          19 Claims

ABSTRACT OF THE DISCLOSURE

A process for the production of a copolymer comprising oxyalkylene and carboxyalkylene units. A lactone and an epoxide are reacted with a chain initiator in the presence of a catalyst. The lactone and epoxide are added simultaneously to the chain initiator at such rates that each of the lactone and the epoxide react with the chain initiator or growing chain at substantially constant rate during the total addition.

---

The invention relates to copolymers.

British Pat. 880,923 describes a process for the manufacture of oxyalkylene-carboxyalkylene polymers. The patent describes a process in which epoxide is added to a mixture of initiator and lactone with cooling. The epoxide normally needs to be used as a gas under pressure. Furthermore it is not easy to control the cooling in order to keep the reaction rates relatively constant so that the desired product of low melting point is produced with the desired reproducibility.

According to the invention there is provided a process for the production of a copolymer comprising oxyalkylene and carboxyalkylene units by reacting a lactone and an epoxide with a chain initiator in the presence of a catalyst, wherein the lactone and epoxide are added simultaneously to the chain initiator at such rates that each of the lactone and the epoxide react with the chain initiator or growing chain at substantially constant rate during the total addition.

The lactone and the epoxide may be added separately but it is preferred that they be added as a mixture. Often they will be added as a solution of the epoxide in the lactone.

The copolymers produced according to the invention comprise substantially alternating epoxide and lactone units, but it will be understood that when the epoxide to lactone molar ratio is not 1:1 there will inevitably be present small blocks of epoxide and/or of lactone units. The number of epoxide or lactone units in such blocks will generally be a small integer, for example 2, 3 or 4, and the copolymer will not be a block polymer in the generally accepted sense of that term.

It is among the advantages of the process according to the invention that the copolymers can be produced reproducibly and can be of lower melting point than copolymers formed from the same quantities of the same starting materials but not using the process of the present invention. A consequential advantage is that a normally liquid copolymer can be produced by the process according to the invention with a higher content of lactone units than a copolymer of the same melting point prepared from the same starting materials by other processes.

The process of the invention also has the advantage that the exotherm derived from too rapid polymerization can be avoided since only a small amount of free monomer is present in the reaction mixture at any time. Further, as a relatively large excess of lactone is usually used, less precautions need generally be taken against the loss of ethylene oxide or other lower epoxide since it is desirably in solution in the lactone.

It will be understood that the lactone may comprise two or more lactones, the epoxide may comprise two or more epoxides and the chain initiator may comprise two or more compounds having the specified property.

By "lactone" we mean a compound of the formula

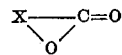

wherein X is a —(CR$_2$)$_n$— group in which $n$ is an integer from 4 to 7 and in which each of the 8 to 14 groups R is any group selected from methyl, ethyl n-propyl and isopropyl groups and hydrogen, chlorine and bromine atoms, provided that the total number of carbon atoms in the —(CR$_2$)$_n$— group does not exceed 12 and provided that there are no more than 2 halogen atoms in the —(CR$_2$)$_n$— group.

Desirably $n$ is 5, i.e. the lactone is an epsilon-caprolactone and preferably the lactone is epsilon-caprolactone, or a methyl epsilon-caprolactone, or a mixture of isomeric methyl-epsilon-caprolectones, or a mixture of isomeric methyl-epsilon-caprolactones with epsilon-caprolactone.

Other specific lactones that may be used, although with less preference than those just specified, are delta-valerolactones and zeta-enanthalactones; these may be used alone or as mixtures with each other or with one or more of the epsilon-caprolactones.

By "epoxide" we mean compounds having an oxirane or an oxetane ring or mixtures of such compounds.

Suitable classes of compounds include oxiranes and oxetanes substituted with alkyl or aryl groups, in particular chloro-substituted or alkoxy- or aryloxy- substituted alkyl or aryl groups.

Oxiranes and oxetanes substituted with alkyl or aryl groups which groups are substituted by ester groupings, being alkoxy- or aryloxy-carbonyl or alkyl- or aryl-carbonyloxy groups, are also suitable. Oxiranes and oxetanes substituted with groups further substituted with active hydrogen atoms attached to nitrogen, sulphur or oxygen atoms may be used. The products obtained from them will, however, be branched, the active hydrogen atom reacting as a chain initiator.

Suitable epoxides include 1,2-epoxyethane, 1,2-epoxypropane, 1,2-epoxybutane, 1,2-epoxyoctane, 1,2-epoxydecane, 1,2 - epoxydodecane, 1,2 - epoxyeicosane, 3,4-epoxyoctane, glycidyl ethers, for example, allyl glycidyl ether, octyl glycidyl ether, butyl glycidyl ether, isooctyl glycidyl ether, phenyl glycidyl ether, cresyl glycidyl ether, glycidyl esters, for example glycidyl methacrylate and glycidyl esters of fatty acids such as glycidyl laurate, glycidyl decanoate and glycidyl palmitate, glycidol, dipentene monoxide, pinene monoxide, limonene monoxide, epoxidized fatty esters, for example octyl epoxystearate, styrene oxide, cyclohexane epoxide, epichlorhydrin, oxetane and 2,3-di(chloromethyl) oxetane.

The preferred epoxides are 1,2-epoxyethane and 1,2-epoxypropane.

Diepoxides may be used, if desired, in admixture with a monoepoxide. However, if too large a proportion of diepoxide is used the copolymer produced will not be linear but will be cross-linked. Suitable diepoxides include diglycidyl ether and diglycidyl ethers of diols, for example ethylene glycol diglycidyl ether and resorcinol diglycidyl ether, 1:2,3:4-diepoxy butane and limonene diepoxide.

A modification of the invention provides for a portion of the epoxide to be replaced by an aziridine, for example, aziridine itself.

By "chain initiator" is meant a compound which contains at least one reactive hydrogen atom capable of opening the lactone ring and/or the epoxide ring.

The chain initiator may be an alcohol, amine, mercaptan, phenol or carboxylic acid. Preferably the chain initiator contains not less than two such reactive hydrogen atoms and it may be a polyfunctional alcohol, amine, mercaptan, phenol, aminoalcohol, mercaptoalcohol, carboxylic acid, hydroxycarboxylic acid or aminocarboxylic acid. Thus the main initiator is of the formula $$R(ZH)_a$$

in which R is aliphatic, cycloaliphatic, aromatic or heterocyclic group, Z is —O—, —S—, —C(O)O—, —NH— or —NR'— where R' is an alkyl, aryl, aralkyl or cycloalkyl group, and $a$ is an integer, the integer being preferably not less than 2.

The initiator advantageously has the formula $$HA—(CR_2^2)_m—AH$$

in which formula the groups HA—, which may be the same or different, are carboxyl groups or monoalkylamino groups or mercapto groups or hydroxyl groups and the group —$(CR_2^2)_m$— is a group containing a chain of from two to eight carbon atoms in which the groups $R^2$ may be any group selected from methyl, ethyl, n-propyl, iso-propyl, n-butyl, iso-butyl, s-butyl, t-butyl, allyl and 1-methylallyl groups, hydrogen, chlorine and bromine atoms or may be groups of the formula $$—Y—R^3 \text{ or } —Z'—Y—R^3$$

in which formula —Y— is an ether linkage or an ester linkage which may be an oxycarbonyl group or a carbonyloxy group, —Z'— is a methylene, ethylene, propylene, trimethylene, tetramethylene, or methyl-substituted trimethylene group and —$R^3$ is a methyl, ethyl, n-propyl, iso-propyl, n-butyl, iso-butyl, s-butyl, t-butyl, allyl or 1-methylallyl group, provided that at least two of the groups $R^2$ are not hydrogen.

The most suitable initiators are those in which the two groups HA— are hydroxyl groups, particularly those in which the groups $R^2$ of the carbon atoms adjacent to the groups HA are hydrogen atoms. Thus it is preferred to use, as initiators, glycols of the formula $$HO—CH_2—(CR_2^2)_{m-2}—CH_2—OH$$

The group —$(CR_2^2)_{m-2}$— has from one to six carbon atoms in the chain and is substituted as provided for above, the substituents being preferably other than chlorine and bromine. Thus the lowest member of this series is 2,2-dimethylpropan-1,3-diol(neopentyl glycol). Other members of the series that are particularly suitable include 2,3-dimethylbutan-1,4-diol, 2,3,4-trimethylpentan-1,5-diol, 2,2-di(acetoxymethyl)-propan-1,3-diol (the diacetate of pentaerythritol) and 2,2,4- and 2,4,4-trimethylhexan-1,6-diols.

Other very suitable initiators include 1,2-dimethylethane-1,2-diol, 1,2,2-trimethylpropane-1,3-diol, 1-isopropyl-2 - methylpropane - 1,3 - diol, 2,2 - dimethyl-5-amino-1-pentanol, 2,2-dimethylsuccinic acid, 3,4-dichloroadipic acid, 2,3-dichlorosuccinic acid, 2,3-dibromosuccinic 2,3-dimethylsuccinic acid, 1,2-di(n-propyl)ethan - 1,2 - diol, 1,2-diethylethan-1,2-diol, the tetra-allyl ether of sorbitol, 2,5-dimethyladipic acid, 2,2,3 - trimethylbutan-1,4-diol, 2,3,4-trimethylpentan-1,5-diol and the mono-allyl ether of trimethylolpropane.

Other initiators which may be used include glycols HO(CH$_2$)$_p$OH in which $p$ is an integer from 2 to 10, for example ethylene glycol and hexane-1,6-diol, alkylene ether glycols of the formulae $$HO[(CH_2)_qO]_pH \text{ and } HO[CH(CH_3)CH_2O]_pH$$

in which $q$ is an integer from 2 to 5 and $p$ is an integer from 2 to 10; N-alkyldiethanolamines; cyclohexane diols and other cycloaliphatic diols; hydroquinone; aryl aliphatic diols such as hydroxymethyl phenyl propanols and phenylene diethanols; amino alcohols, for example, ethanolamine, diethanolamine, triethanolamine, triisopropanolamine, p-aminophenylethanol and aminocyclohexanols, diamines of the formula $$R^4NH(CH_2)_pNHR^4$$

in which $p$ is an integer from 2 to 10 and $R^4$ is hydrogen or an alkyl, aryl, aralkyl or cycloalkyl group, for example ethylene diamine, hexamethylene diamine and N-methyl hexamethylene diamine; aromatic diamines such as p-phenylenediamine, 4,4'-methylene-dianiline, 4,4'-diamino-diphenylmethane, and 2,7-fluorenediamine; cycloaliphatic diamines such as 4,4'-isopropyldiene bis cyclohexylamine; heterocyclic amines such as piperazine; polyols such as glycerol, trimethylolpropane, hexanetriol, pentaerythritol, sorbitol, alkyl glycosides, glucose, starch and cellulose; polyamines, for example triethylene tetramine and toluene-2,4,6-triamine; carboxylic acids, for example, adipic, phthalic, salicyclic, 6-hydroxycaproic, aminobenzoic, citric and trimellitic acids. Water and hydrogen sulphide are suitable inorganic initiators.

The reaction is carried out in the presence of a catalyst, for example a Lewis acid, the catalyst being preferably present with the chain initiator to which the mixture of lactone and epoxide is added. Preferred catalysts include boron trifluoride, particularly in the form of a complex with an organic compound such as diethyl ether, stannic chloride and aluminium chloride. Many other chlorides are also suitable, for example, those of beryllium, zinc, cadmium, zirconium, antimony, bismuth and iron.

It has also been found that it is sometimes advantageous to use, as catalyst, boron trifluoride in combination with a proton acid. The proton acid is preferably an organic acid, particularly a strong organic acid, for example p-toluene sulphonic acid.

The temperature of the reaction is advantageously in the range 20–100° C. and it is preferably maintained in the range 50–75° C.

The molar ratio of the epoxide to the lactone, particularly of ethylene oxide to caprolactone, is suitably from 0.2:1 to 4:1 and is preferably from 0.3:1 to 2:1.

It is desirable in some application of the copolymers, for example, in the manufacture of polyurethanes, that boron trifluoride or other acidic catalyst should be wholly or largely removed. The acidic catalyst can generally be removed by washing the copolymer with water.

The molecular weight of the copolymer will be governed by the amount of initiator used. The copolymer suitably has a molecular weight in the range 500–10,000. For many purposes a copolymer having a molecular weight in the range 900–5000 is advantageous, whilst for the production of a polyurethane the copolymer preferably has a molecular weight in the range 100–2500.

The use of the preferred initiators, namely the glycols having the formula $$HOCH_2(CR_2^2)_{m-2}CH_2OH$$

also results in the production of copolymers which are generally of lower melting point than those produced with $\alpha,\omega$-straight chain glycols.

Copolymers can be manufactured that are suitable for use as plasticizers in synthetic resins, particularly polyvinyl chloride and vinyl chloride copolymers, and the invention includes synthetic resin compositions including the copolymers as plasticizers.

Copolymers produced according to the invention and having two or more alcoholic hydroxyl groups in the molecule can be manufactured that are particularly suitable for reaction with organic compounds containing at least two isocyanate groups in the molecule to form isocyanate-terminated urethane prepolymers, and the invention also includes such process. An excess of isocyanate groups over hydroxyl groups should normally be used. A suitable ratio of isocyanate groups to hydroxyl groups is about 2:1, but the particular ratio can be varied in accordance with the desired properties in the polyurethane product.

The isocyanate-terminated urethane prepolymer may be reacted with a polyfunctional organic compound containing at least two active hydrogen atoms attached to oxygen or nitrogen or water. Preferably these active hydrogen atoms are part of alcoholic hydroxyl groups, primary amino goups or secondary amino groups. The isocyanate groups react with active hydrogen atoms to form urethane or substituted urea linkages, thereby forming a polyurethane polymer.

The reaction of the isocyanate-terminated urethane prepolymer with the polyfunctional compound may take place during the formation of the isocyanate-terminated urethane prepolymer, or thereafter. Thus the polyfunctional compound may be added at the start of the reaction between the copolymer and the polyisocyanate or thereafter.

A preferred process employs a linear copolymer having two alcoholic hydroxyl groups and a diisocyanate to lead to the production of a polyurethane rubber particularly suitable for use in the soling of footwear. The copolymers containing three or more alcoholic hydroxyl groups in the molecule are particularly suitable for the production of polyurethane foams.

The nature and proportions of the compounds used will naturally depend on the desired properties of the polyurethane. A range of polyisocyanates that may be suitable is listed by Siefken (Annalen, 562, pages 122–135). If desired the polyurethane may, in principle, be modified or treated by any suitable method known to those skilled in the art for polyurethanes derived, for example, from polyethers. For example it may be cross-linked, or a urethane foam produced by the formation or pressure of a gas during the formation of the polyurethane.

Many modifications of the process for the production of the polyurethane and thus of the resulting product of the invention will be apparent to one skilled in this art after reviewing the foregoing description. For example, the process may incorporate and thus the product may contain curing agents, foaming agents, such as water, low-boiling point liquid, and blowing agents activated by chemical reaction, and cross-linking agents.

added over a period of 4.0 hours. Throughout the addition and for 1 hour thereafter, the reaction mix was maintained at 60–70° C.

The resulting oxyalkylene-carboxyalkylene polymer was a water-white, viscous liquid having a hydroxyl number of 56.5, a carboxyl number of 0.7 and an average molecular weight of 1960.

EXAMPLE 2

A polyurethane rubber was prepared from the polyester produced in Example 1, using the following molar ratio of reactants:

0.26 mole polyester,
1.00 mole butane-1,4-diol and
1.35 moles 4,4'-di-isocyanatodiphenylmethane.

The di-isocyanate was added to a mixture of the polyester and butane diol, heated to 100° C. and the whole was stirred vigorously to dissolve the isocyanate. The mix was then degassed and pressed at 20 tons/sq. in. for 40 mins. at 165° C. and the resulting sheet was post-cured for 24 hours at 100° C.

PROPERTIES OF P.U. RUBBER (a) Tensile properties:
  100% extension _____kg./sq. cm__   112
  300% extension _____kg./sq. cm__   185
  Ultimate T.S. _____kg./sq. cm__   432
(b) Hardness—Shore "A" _____   95
(c) Cold flex temp. (.06″) _____° C__ −27.5

EXAMPLE 3

The polyester produced in Example 1 was also used to plasticize polyvinyl chloride at a level of 100 parts polyester to 100 parts "Corvic" p65/50. A clear, colorless sheet was obtained.

EXAMPLE 4–9

The procedure of Example 1 was repeated. The weights of reactants used and the properties of the polymers obtained are listed in the Table 1.

TABLE 1

| Example number | 1 | 4 | 5 | 6 | 7 | 8 | 9 |
|---|---|---|---|---|---|---|---|
| Neopentyl glycol: | | | | | | | |
| Grams | 10.4 | 20.8 | 20.8 | 20.8 | 20.8 | 28.8 | 28.8 |
| Moles | 0.1 | 0.2 | 0.2 | 0.2 | 0.2 | 0.277 | 0.277 |
| Ethylene oxide: | | | | | | | |
| Grams | 69.5 | 123.5 | 105.3 | 85.1 | 61.3 | 50.8 | 40 |
| Moles | 1.57 | 2.81 | 2.39 | 1.93 | 1.93 | 1.15 | 0.91 |
| ε-Caprolactone: | | | | | | | |
| Grams | 120 | 256 | 273.5 | 294.0 | 317.9 | 328.4 | 339.2 |
| Moles | 1.05 | 2.25 | 2.39 | 2.57 | 2.79 | 2.88 | 2.98 |
| Catalyst, grams | 0.25 | 0.5 | 0.5 | 0.5 | 0.8 | 0.8 | 0.8 |
| Time of addition, hours | 4 | 5 | 8 | 8 | 6.5 | 16 | 16 |
| Polymer properties: | | | | | | | |
| Color | Water white | Water white | Water white | Light yellow | Light yellow | Light yellow | Light yellow |
| State at 25° C | Viscous liquid | Viscous liquid | Viscous liquid | Viscouse liquid | Viscous liquid | Semi-solid.[1] | Semi-solid.[2] |
| Hydroxyl number | 56.5 | 56.2 | 62.4 | 55.0 | 53.9 | 55.5 | 53.0 |
| Average molecular weight | 1,960 | 1,970 | 1,770 | 1,990 | 2,036 | 1,982 | 2,110 |
| Oxide content, percent by weight | 34.7 | 31.3 | 26.4 | 2.13 | 15.5 | 12.7 | 10.0 |

[1] M.P. 30° C.
[2] M.P. 38° C.

EXAMPLE 1

10.4 g. neopentyl glycol (0.1 mole) were heated to 60° C. with 0.25 g. boron trifluoride diethyl etherate (47% BF$_3$) as catalyst. A mixture of 120 g. caprolactone (1.05 moles) and 69.5 g. ethylene oxide (1.6 moles) was then

EXAMPLES 10–15

The polymers obtained in each of Examples 4 to 9 were converted into polyurethane rubbers as described in Example 2. The properties of the rubbers, including those of the rubber obtained in Example 2, are shown in Table 2.

TABLE 2

| Example number | 2 | 10 | 11 | 12 | 13 | 14 | 15 |
|---|---|---|---|---|---|---|---|
| Tensile properties: | | | | | | | |
| (a) 100% extension (kg./sq. cm.) | 110.5 | 135.7 | 146.0 | 124.8 | 125.5 | 136.1 | 137.5 |
| (b) 300% extension (kg./sq. cm.) | 155.0 | 222.7 | 240.0 | 196.8 | 191.2 | 205.5 | 210.5 |
| (c) U.T.S | 450.0 | 353.2 | 600.0 | 589.5 | 558.7 | 590.5 | 600.5 |
| (d) Extension (percent) | 520 | 390 | 500 | 510 | 490 | 500 | 500 |
| Hardness (Shore A) | 98 | 98 | 98 | 98 | 98 | 98 | 98 |
| Cold flex. temp., ° C. (60 thou. sheet) | −27.5 | | | −29.0 | −29.5 | | −30.0 |

EXAMPLE 16

A portion of the polymer obtained in Example 7 was dissolved in toluene to give a solution of approximately 40% concentration and the solution was placed in a narrow cylindrical vessel down which water was passed slowly until the boron trifluoride was removed. The water and toluene were then removed and the resulting oxyalkylene-carboxyalkylene copolymer was found to have a hydroxyl number of 50.5, a carboxyl number of 0.1 and an average molecular weight of 2200. The copolymer was used to prepare a polyurethane rubber as described in Example 2. The rubber obtained was less coloured, more readily cured and had slightly better properties than the rubber obtained from the copolymer from which the boron trifluoride had not been removed, that is, the rubber obtained in Example 13.

EXAMPLE 17

18.4 g. butane-1,4 diol were heated to 60° C. with 0.8 g. boron trifluoride diethyl etherate (47% $BF_3$) as catalyst. A mixture of 329 g. caprolactone and 60.0 g. ethylene oxide was then added over a period of 16 hours. Throughout the addition and for 1 hour thereafter, the reaction mix was maintained at 60–70° C.

The resulting oxyalkylene-carboxyalkylene polymer was a water-white solid (M.P. 35° C.) having a hydroxyl number of 53.6, a carboxyl number of 1.2 and an average molecular weight of 2050.

We claim:
1. In a process for the production of a copolymer comprising oxyalkylene and carboxyalkylene units by reacting a lactone, selected from delta valerolactones, epsilon caprolactones and zeta enanthalactones, and an epoxide having an oxirane or oxetane ring with a chain initiator containing at least one reactive hydrogen atom capable of opening a lactone or an epoxide ring in the presence of a catalyst selected from organic acids and Lewis acids; the improvement wherein a homogeneous mixture of the lactone and epoxide is added to the chain initiator at a substantially constant rate sufficiently slow such that the lactone and the epoxide each react with the chain initiator or a growing chain originating from the chain initiator at substantially constant rate during the total reaction.

2. A process according to claim 1, wherein the lactone is epsilon caprolactone or a methyl epsilon caprolactone or a mixture thereof.

3. A process according to claim 1, wherein the epoxide is an alkyl or aryl substituted oxirane or oxetane.

4. A process according to claim 3, wherein the said alkyl or aryl substituent is a chloro- or alkoxy- or aryloxy-substituted alkyl or aryl group.

5. A process according to claim 4 wherein the epoxide is a glycidyl ether or a glycidyl ester.

6. A process according to claim 1, where the epoxide is 1,2 epoxyethane or 1,2 epoxypropane.

7. A process according to claim 1, wherein the reaction mixture also contains an aziridine.

8. A process according to claim 1, wherein the chain initiator is of the formula $$R(ZH)_a$$

where

R is aliphatic, cycloaliphatic, aromatic or heterocyclic group,

Z is —O—, —S—, —C(O)O—, —NH—, or —NR'— where R' is alkyl, aryl, aralkyl, or cyclo- aryl group, and $a$ is an integer greater than 1.

9. A process according to claim 8 wherein the initiator is of the formula $$HA—(CR^2{}_2)_m—AH$$

where the groups HA— are carboxyl, monoalkylamino, mercapto or hydroxyl groups and may be the same or different, the groups $R^2$ may be any group selected from methyl, ethyl, propyl, butyl, allyl and 1-methylallyl groups or hydrogen, provided that at least two of the groups $R^2$ are not hydrogen, $m$ is an integer from 2 to 8.

10. A process according to claim 8, modified in that in the formula $$HA—(CR^2{}_2)_m—AH$$

the groups $R^2$ are additionally selected from groups of the formula $$—Y—R^3 \text{ and } —Z'—Y—R^3$$

where

Y is an ether or ester linkage,

Z' is a methylene, ethylene, propylene, trimethylene, tetramethylene or methyl-substituted tirmethylene group, and $R^3$ has the meaning assigned to $R^2$ in claim 9.

11. A process according to claim 9, wherein the initiator is of the formula $$HO—CH_2—(CR^2{}_2)_{m-2}—CH_2OH$$

12. A process according to claim 11, wherein the initiator is 2,2-dimethyl propan-1,3-diol.

13. A process according to claim 8, wherein the initiator is a glycol of formula $$HO(CH_2)_pOH \text{ or}$$
$$HO((CH_2)_qO)_pH \text{ or}$$
$$HO(CH(CH_3)CH_2O)_pH$$

where $p$ is an integer from 2 to 10, and
$q$ is an integer from 2 to 5.

14. A process according to claim 13, wherein the initiator is ethylene glycol or butane-1,4-diol.

15. A process according to claim 1, wherein the catalyst is boron trifluoride, an organic complex thereof or a mixture thereof with a proton acid.

16. A process according to claim 1, wherein the temperature of the reaction mixture is maintained in the range 20–100° C.

17. A process according to claim 16, wherein the temperature is in the range 50–75° C.

18. A process according to claim 1, wherein the molar ratio of the epoxide to the lactone is in the range 0.2:1 to 4:1.

19. A process according to claim 18, wherein said ratio is in the range 0.3:1 to 2:1.

References Cited
UNITED STATES PATENTS

| | | | |
|---|---|---|---|
| 2,962,524 | 11/1960 | Hostettler et al. | 260—484 |
| 3,312,753 | 4/1967 | Bailey et al. | 260—823 |
| 3,375,231 | 3/1968 | Fukui et al. | 260—78.3 |
| 3,629,374 | 12/1971 | Lundberg et al. | 260—899 |
| 3,682,865 | 8/1972 | Jenkins et al. | 260—75 EP |
| 3,689,531 | 9/1972 | Critchfield et al. | 260—484 A |

WILLIAM H. SHORT, Primary Examiner

E. A. NIELSEN, Assistant Examiner

U.S. Cl. X.R.

260—78.3 R